United States Patent
Giordano

[15] 3,703,194
[45] Nov. 21, 1972

[54] RESILIENT CONNECTOR
[72] Inventor: Louis Giordano, P.O. Box 394, Califon, N.J. 07830
[22] Filed: July 30, 1970
[21] Appl. No.: 59,609

Related U.S. Application Data
[63] Continuation-in-part of Ser. No. 846,800, Aug. 1, 1969, abandoned.

[52] U.S. Cl. ................138/109, 285/194, 285/238, 52/16
[51] Int. Cl. ............................................F16l 31/00
[58] Field of Search .........138/109; 285/238; 141/27; 296/28; 285/194, 213, 110; 210/477, 479, 455; 260/41; 52/11, 12, 16; 61/14

[56] References Cited
UNITED STATES PATENTS

| | | |
|---|---|---|
| 172,341 | 1/1876 | Pfeifer........................210/477 |
| 3,560,441 | 2/1971 | Schwarcz......................260/41 |
| 3,067,783 | 12/1962 | Berland........................141/27 |
| 2,797,955 | 7/1957 | Wilfert..........................296/28 |
| 2,756,078 | 7/1956 | Klingler.......................285/194 |
| 2,314,315 | 3/1943 | Scheele.......................285/213 |
| 3,129,020 | 4/1964 | Bujnowski....................285/110 |

Primary Examiner—Martin P. Schwadron
Assistant Examiner—William H. Wright
Attorney—Herbert Smith Sylvester

[57] ABSTRACT

A resilient connector suitable for use on sheet metal which comprises an integral resilient plastic molding having a lower tubular section and a pair of flanges at its top extremity. The edges of an opening in sheet metal are grasped between the flanges. Preferably a grid is molded integrally with the top end of the device, and assumes a position substantially flush with the sheet metal.

3 Claims, 7 Drawing Figures

INVENTOR.
LOUIS GIORDANO
BY
Herbert Smith Sylvester
ATTORNEY

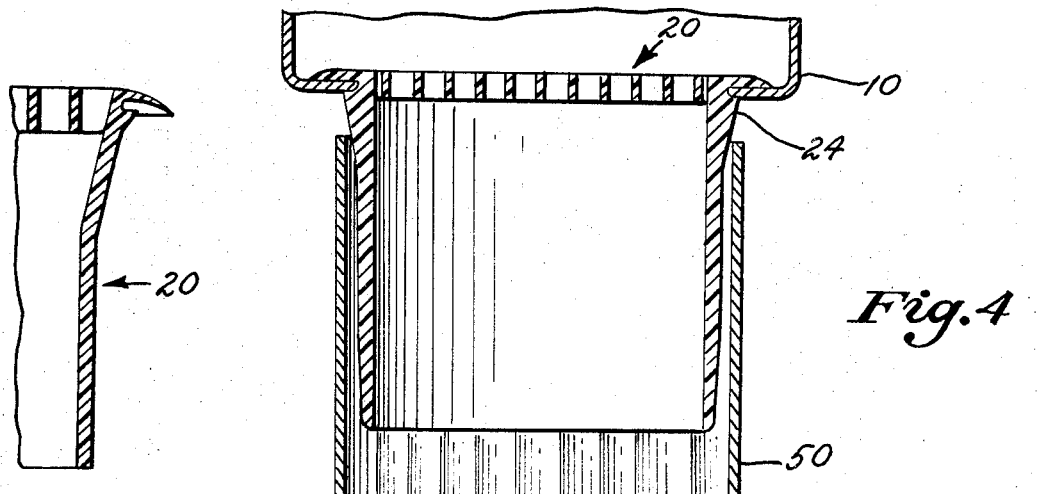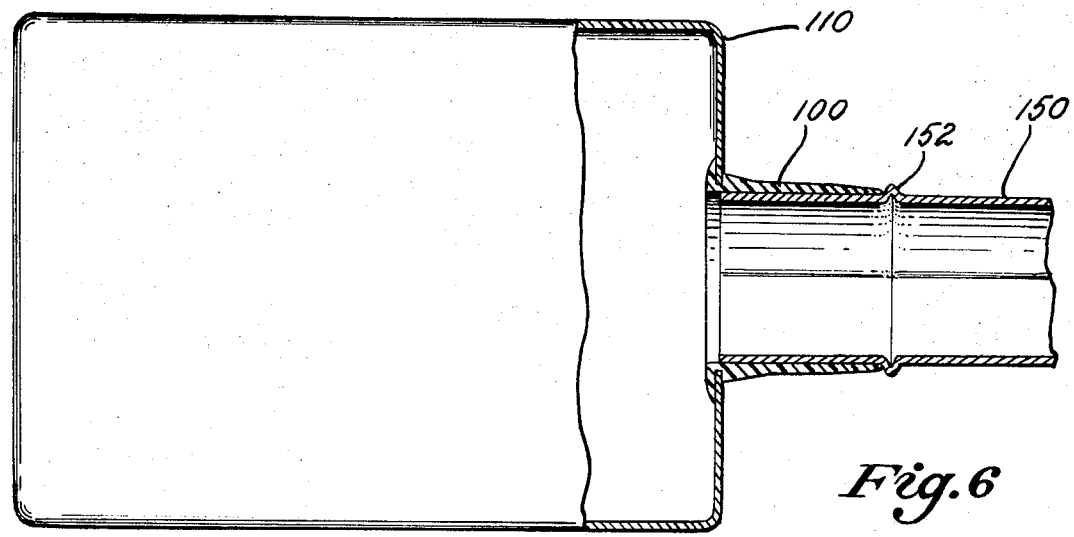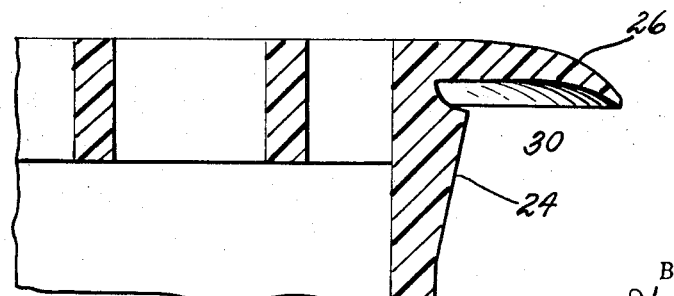

RESILIENT CONNECTOR

This application is a continuation-in-part of my copending application Ser. No. 846,800, now abandoned filed Aug. 1, 1969.

This invention relates to resilient connectors for use on sheet material, e.g., on sheet metal gutters, roof drains and air ducts. The invention provides a very simple and inexpensive construction which provides improved ease of insertion of the connectors into sheet metal. The instant connectors are advantageous for use as eave tubes in connecting a fabricated gutter with a downspout or a conductor pipe or other drainage conduit for fluids, and for connecting side take-off branches with larger air ducts inasmuch as it readily and securely engages unrimmed sheet metal in a leak proof manner with minimal projection into the fluid-delivering side of the sheet metal structure. Such assembled structures, as well as the process of assembling such, are within the ambit of the present invention.

The resilient connector of this invention materially reduces the weight of the structures in which it is used and also reduces the cost and time required for installation and secures a more efficient and serviceable structure, as compared to previously proposed devices. In addition, it insulates dissimilar metals and permits the use thereof in a unitary system without development of galvanic corrosion.

An eave tube in accordance with the instant invention may also provide in one structure the elements previously assembled as two separate distinct devices, i.e., the downspout and the screen, by integral molding of a grid therein. Such a grid serves a dual function in that in addition to screening, it provides a structural function in assisting in the maintenance of the structural integrity of the eave tube.

Other objects and advantages reside in the details of construction and operations as more fully hereinafter described and claimed, reference being had to the accompanying drawings forming part hereof, wherein like numerals refer to like parts throughout and in which:

FIG. 4 is a fragmentary side view, in elevation, of a completed installation showing a gutter, an eave tube of slightly modified construction, and a leader;

FIG. 5 is a fragmentary enlarged view in section of a portion of the eave tube of FIG. 4 before its insertion into the gutter;

FIG. 6 is a sectional view in elevation of a rectangular air duct which is connected by a resilient connector to a cylindrical take-off branch; and FIG. 7 shows in detail another eave tube construction in accordance with the invention.

Figures 1, 2:
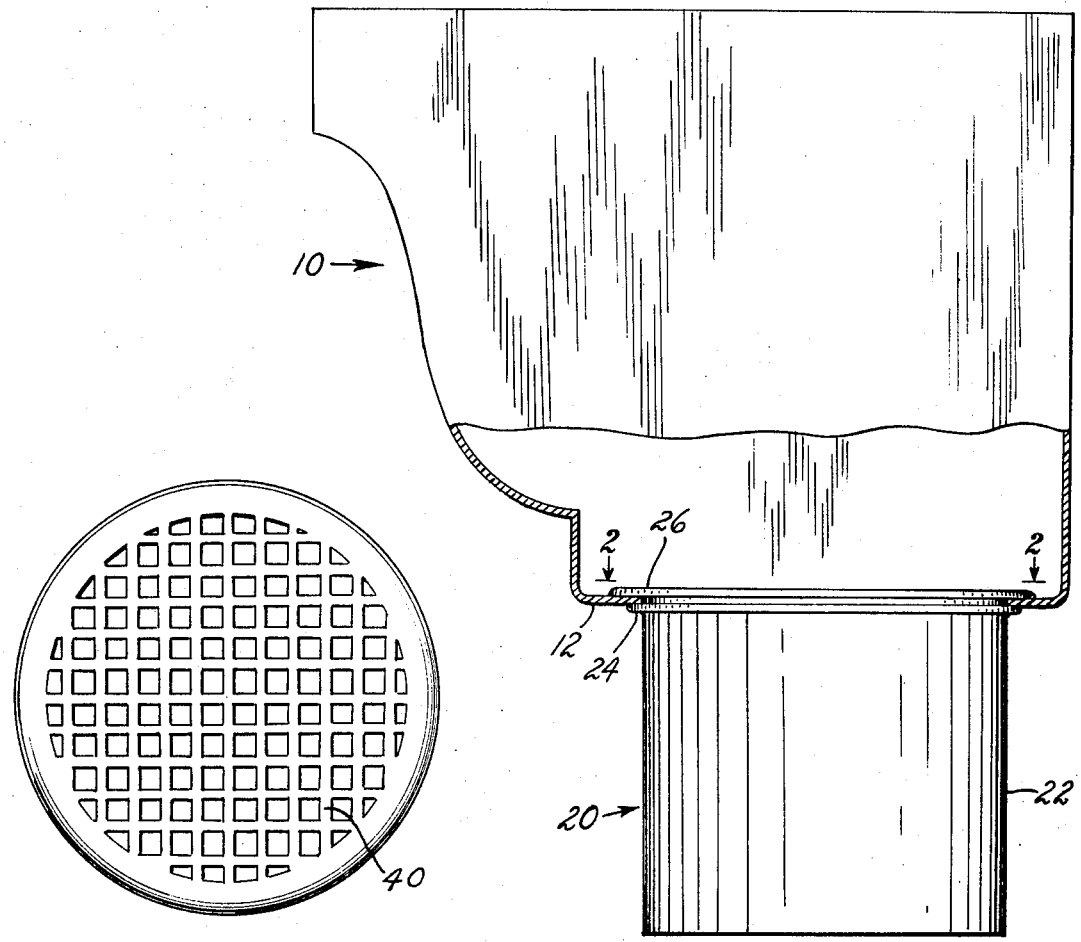
FIG. 1 is a sideview, in elevation, of a sheet metal gutter showing the instant snap-in eave tube installed thereon.
FIG. 2 is a top view of the snap-in eave tube of FIG. 1 taken along the line 2—2 of FIG. 1.
Figure 3:
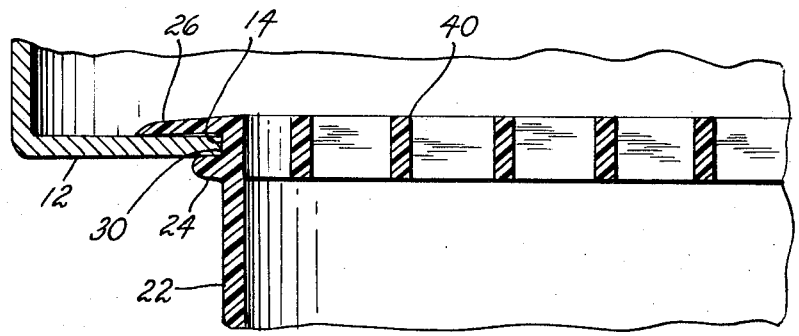
FIG. 3 is a fragmentary enlarged view in section of a portion of the snap-in eave tube device of FIG. 1.

Referring now to FIGS. 1-3 of the drawings in detail, wherein for the purpose of the illustration there is disclosed a preferred embodiment of the present invention, the reference numeral 10 represents generally a sheet metal aluminum gutter of the type generally known as a box gutter which has a horizontal or substantially flat bottom 12. A circular opening 14 is punched in the flat bottom 12 of the aluminum gutter, and inserted therein is a plastic snap-in eave tube 20.

The plastic snap-in eave tube has a downwardly depending cylindrical wall 22 of outer diameter slightly less than the diameter of the round hole 14 in the gutter e.g., about 0.05 to 0.2 inches less. At the top of the cylindrical wall 22 are a pair of outwardly extending flanges 24 and 26, which define a reentrant groove 30 therebetween The outside diameter of the lower flange 24 is greater than that of the cylindrical wall 22 and the opening 14 in the gutter wall 12, overlapping the latter by about 0.1 to 0.2 inches continuously around the periphery thereof. The upper flange 26 projects outwardly approximately twice as far as the lower flange and tapers to a feather edge at its outer end. The flanges 24 and 26 are of substantially equal thickness and are slightly concave on their opposing faces so that their outer lips seal tightly to the surfaces of the gutter bottom 12 regardless of the possible presence of burrs or other irregularities at the edge of the hole 14.

The lower end of the cylindrical tube 22 is open to discharge into a downspout or other appropriate conduit. The upper end of the tube is bridged by an integrally molded grid 40 consisting of a plurality of right angle elements approximately one-sixteenth of an inch wide and one-eighth of an inch deep which define a regular network of openings approximately one-quarter of an inch square. The grid 40 acts as a strainer, e.g., for leaves and other foreign matter, and also provides supportive structural integrity to the upper end of the snap-in eave tube to assist it in retaining its shape and dimensions. The grid is substantially flat across its top, or if desired, may be convex in shape. The eave tube is molded as a unitary integral molding from a flexible, resilient plastic material such as polyvinylchloride.

In use, the flat bottom 12 of the aluminum gutter 10 is punched or drilled to create the circular opening 14. The snap-in eave tube 20 is inserted into the opening 14 with the bottom flange 24 resting on the upper surface of the bottom 12 of the gutter 10. The upper flange projects above the upper surface of the gutter bottom only about one-sixteenth of an inch, which facilitates substantially complete drainage of the gutter.

The bottom flange 24 is proportioned to be somewhat greater in diameter than the diameter of the circular opening in the bottom 12 of the gutter, whereas the throat diameter of the annular reentrant groove 30 is substantially the same as that of the tube 20, i.e., is slightly less than the diameter of the opening 14. The top of the grid of the snap-in eave tube is struck a sharp blow with a mallet or similar tool, which drives the lower flange 24 through the opening 14. The upper flange 26 being appreciably larger in diameter does not pass through the opening 14, with the result that the flanges 24 and 26 grasp the surfaces of the bottom 12 of the aluminum gutter tightly in a watertight seal.

The throat of the annular reentrant groove 30 is of approximately the thickness of the standard aluminum gutters, suitably about 0.03 inches, and the upper flange 26 is molded such that its outer periphery depends slightly when unrestrained so as to grasp the upper surface of the bottom 12 snugly when held thereagainst by the lower flange 24.

The eave tube installation of FIG. 4 is generally similar to that of FIGS. 1—3. However the lower lip of the lower flange 24 of the eave tube of FIG. 4 is tapered gradually for about three-quarters of an inch, to help center the tube in the sheet metal opening during installation. In addition, the outer surface of the depending wall 22 of the tube tapers gradually inwardly for about three-quarters of an inch to make insertion of the tube into the gutter opening easier, and also to facilitate subsequent envelopment of the tube by a corrugated leader or downspout 50. The eave tube is fabricated of molded polyvinylchloride, filled with white pigment which improves light stability and matches the color of the coating applied to the exterior of the gutter 10 and leader 50.

In the embodiment illustrated in FIG. 5, the undersurface of the upper flange is concave and tapers to a feather edge at its periphery. Inasmuch as it is illustrated in its unrestrained condition (prior to use), it depends below the reentrant groove 30. (In doing such the upper flange assumes a fluted shape.)

The lower flange 24 of the tube of FIGS. 4 and 5 has an inwardly sloping upper wall which assists in establishing a fluid-tight seal about an opening which is drilled into the sheet metal from the surface against which the lower flange bears, and is thus substantially flat and free of burrs on that surface.

In the embodiment of FIG. 6, a resilient connector 100 projects outwardly from a rectangular sheet metal trunkline 110 of comparatively large cross-sectional area. A tubular, seamed sheet metal branch duct 150 of substantially smaller, circular cross-sectional area is inserted into the connector 110 for substantially the entire length thereof, and is frictionally engaged thereby. This frictional engagement and the resilient character of the connector provide a substantially air-tight connection between the connector and the tubular branch (even when the latter is seamed). A peripheral ridge 152 on the circular duct positions it in the connector and prevents further entry thereof into the connector. This disposition of the tubular member reinforces the connector and further locks it into the wall of the trunkline.

The connector 100 is generally similar in construction to that illustrated in FIG. 4, but is not provided with an internal grid as the reinforcing action of the tubular member 150 disposed therein provides substantial assistance in maintaining the structural integrity of the connector after insertion.

In use, the trunkline 110 is a plenum or duct typically fabricated of aluminum and normally is installed in its final location. It presents a substantially closed condition, i.e., normally there is no ready access to the interior or of the trunkline. A suitable hole is made in the side wall of the trunkline from the outside using a brace and bit or a circle cutter in an electric drill, and the resilient connector 100 is collapsed on itself, the flanged end is inserted through the hole, and the connector is released to assume its normal unrestrained shape. The connector is then pulled back through the hole until its reentrant groove accepts and its flanges engage the wall of the trunkline. Thereafter, the tubular sheet metal (e.g., seamed stovepipe) branch duct is inserted into the connector to form the final assembly illustrated.

The instant connectors typically range in diameter from about 2 to about 5 inches, and in length from about two to about three inches, in order to pass adequately at low pressure drop the fluids which flow through them and also to engage adequately the conduit into which they deliver such fluids. Preferably they are characterized by a ratio of length to diameter of from about 0.75 to 1 to about 2 to 1, and project for substantially all their length from only one side of the sheet material in which they are mounted. Thus, when used as eave tubes, the end flange projects into the gutter a distance no larger than about one-quarter of an inch, and preferably no more than about one-sixteenth of an inch which facilitates substantially complete drainage.

FIG. 7 illustrates the profile of an eave tube which is injection molded of polyethylene. The cylindrical wall of the tube is of substantially uniform thickness and the entire flange-carrying end third of the tube flares outwardly to guide the tube into the hole in the sheet metal gutter in which it seats.

Although the preferred device is cylindrical in cross-section, it is also possible to use other shapes, e.g., rectangular cross-section for the tube and flanges, and the flanges and grid may be molded arcuately for use with half-round gutters or ducts of other shapes. The device may be molded out of a variety of flexible, resilient materials, including polyvinylchloride, polyethylene, polypropylene, rubber and the like, and preferably is prepared by injection molding or casting of plastisols. In general, the side wall of the connector is tubular, preferably cylindrical, and exhibits no outward and only slight, if any, inward taper as it depends from the flanged end. This construction minimizes reduction in the cross-sectional area through which fluid is conveyed, and facilitates engagement either internally or externally with the duct which carries away the fluid delivered by the connector.

What is claimed is:

1. A resilient connector comprising a tubular member of substantially uniform internal cross-sectional area, a first annular end flange projecting outwardly at one end of said tubular member, a second annular flange disposed on said tubular member immediately axially below said end flange and defining therewith a groove adapted to receive sheet material, said end flange being of greater diameter than said second flange and having its outer extremity tapering to a featheredge which, when unrestrained, depends axially toward said second flange below the innermost axial edge of said groove defined by said second flange, whereby said connector may be snapped in place with sheet material received in said groove and pressed by said second flange into flush fluid tight engagement against the underside of said first end flange.

2. A connector as defined in claim 1, said connector being an integral unitary molding of resilient plastic material and including a grid integrally molded with said one end of said tubular member.

3. The resilient connector of claim 2 in which said plastic material is molded polyvinylchloride filled with white pigment.

* * * * *